O. MACDANIEL.
Evaporating Pan.
No. 54,746.
2 Sheets—Sheet 1.
Patented May 15, 1866.
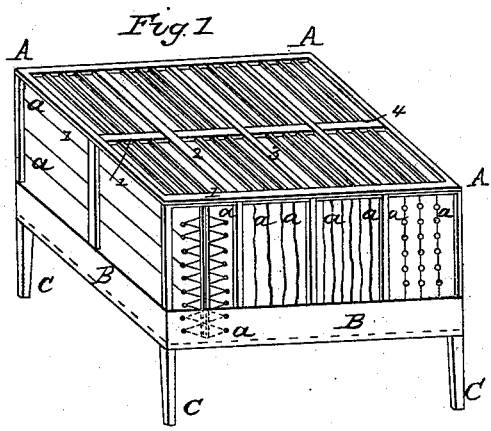
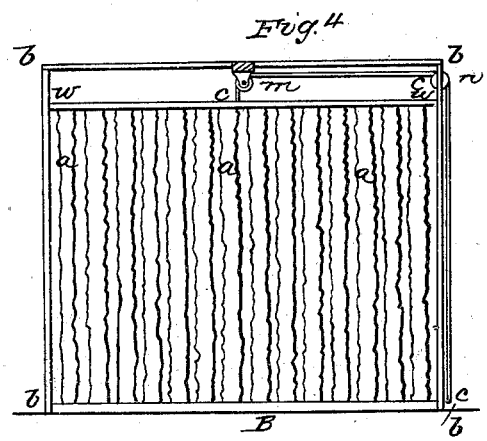
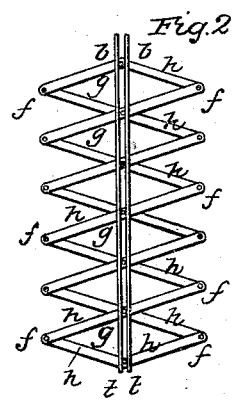
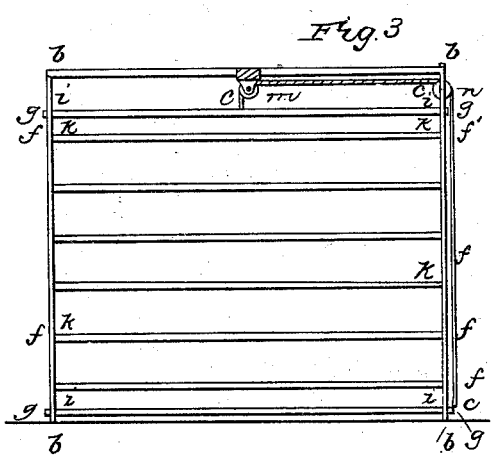
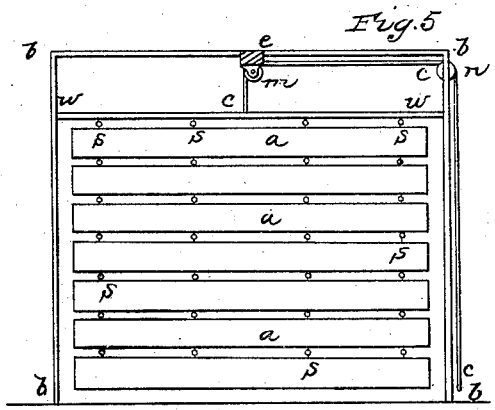
Witnesses
Inventor
O. Macdaniel O. MACDANIEL.
Evaporating Pan.
No. 54,746.
2 Sheets—Sheet 2.
Patented May 15, 1866.
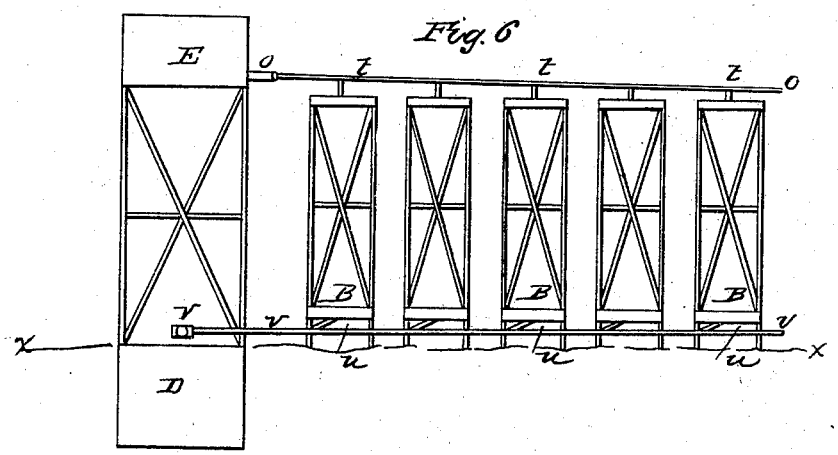
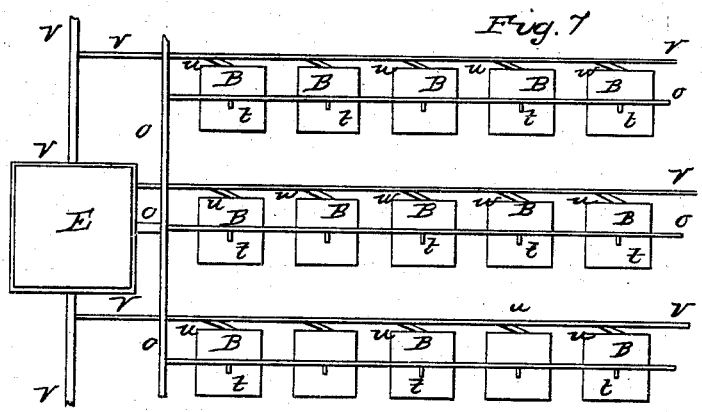

UNITED STATES PATENT OFFICE.

OSBORNE MACDANIEL, OF NEW YORK, N. Y.

IMPROVEMENT IN EVAPORATING SOLUTIONS OF SALT, SUGAR, &c.

Specification forming part of Letters Patent No. 54,746, dated May 15, 1866.

*To all whom it may concern:*

Be it known that I, OSBORNE MACDANIEL, of the city, county, and State of New York, have invented a new and Improved Mode of Evaporation for the Manufacture of Salt, Sugar, and other Substances held in Aqueous Solution; and I do hereby declare the following to be a full, true, and exact description of the same, reference being had to the accompanying drawings, which form a part of this specification.

Figure 1 is a perspective view of a salt-vat, exhibiting evaporating apparatus of different kinds in sections 1, 2, 3, and 4. Fig. 2 is an end view of a carrying or supporting frame seen in section 1, Fig. 1. Fig. 3 is a side view of the same. Fig. 4 is a side view of a carrying-frame seen in sections 2, 3, and 4, Fig. 1, with strips of cloth suspended to it, as seen in section 3, Fig. 1, and slats, in section 4. Fig. 5 is a side view of the same with wooden slats attached to it, as seen in section 4, Fig. 1. Fig. 6, Sheet No. 2, is an elevation of a system of troughs for distributing brine from a high tank, and, after it has passed over evaporating apparatus, returning it to a receiving tank or reservoir. Fig. 7 is a plan of the system of troughs for the circulation of the brine, and of the vats and tanks.

Similar letters indicate the same parts on all the drawings.

The nature of my invention consists in an improved mode of evaporating brine or saccharine juice by means of sheets, cloths, or wooden slats suspended in the air. This system of evaporation is distinguished from that of solar evaporation in the manufacture of salt by the exposure of extensive surfaces to the action of natural or artificial currents of air, instead of limited surfaces within the superficial area of evaporating vats or reservoirs mainly acted upon by the direct rays of the sun.

Suspended sheets, strips of cloth, mats, or wooden slats are attached to and hung upon frames, and their surfaces are kept wet, either by repeated immersion in the brine or saccharine juice or by their being poured upon them from above. By this method of evaporation the brine or saccharine juices are very rapidly and economically evaporated and concentrated.

When thus raised to a high degree of saturation the operation of boiling, for making salt or sugar, may be conducted with but a small amount of fuel. The strong brine, if not boiled, may be conveyed to vats and the salt crystallized by slow evaporation in the open air in the ordinary way.

To enable others skilled in the art to make and use my invention, I will proceed to describe its construction and operation.

Fig. 1 represents an evaporating salt-vat, such as is used in the field. A A, the frame; B B, the brine-reservoir; C C, the legs.

In section 1, Fig. 1, a sheet or coarse cloth of any suitable fabric (indicated by red lines) is suspended on a carrying-frame so constructed that it shuts up when lowered and opens when raised. Fig. 2 is an end view of this frame, and Fig. 3 a side view. It is made of wood.

The movable cross-bars *h h* are fastened at their ends by pivot-joints *f f* and at their intersections by pivot-joints *g g*.

The frame extends across the vat, and the two ends, which are alike, are connected by lateral rods or bars *k k*, which connect the opposite pivot-joints *f f* and the bars *i i*, which connect the pivot-joints *g g*.

The ends of the lateral bars *i i* pass through and are held in place in slots between upright guides *b b* at both ends of the frame.

Upon this frame is fastened an evaporating-sheet, *a a*. (Indicated by red lines, Fig. 1.) It is attached to the upper and lower bars, *i i*, and may be a continuous piece of cloth passing back and forth over one-half of the intermediate bars, or it may be in parts fastened, like a sacking-bottom, between the lateral bars *f f*.

When the frame is lowered it closes, and the cloth will lie flat in folds at the bottom of the vat in the brine. When raised the cloth on the frame will form zigzag inclined planes from top to bottom, as seen in Fig. 1.

The movable carrying-frame is suspended in the vat by a rope, *c c*, fastened to the upper lateral bar *i i*, which passes over a pulley, *m*, above on a cross-beam, *e*, thence to another pulley, *n*, placed on one side of the vat. The carrying-frame is lowered by the rope *c c* for immersing the cloth in the brine, and raised for exposing it to the air for evaporation, which operation is repeated as often as necessary for the concentration of the brine to the proper degree of strength. Balance-weights are attached to the carrying-frame.

Instead of attaching sheets to folding carrying-frames, they may be suspended to cross-bars in a frame extending across the top of the vat, hanging down, as seen in section 2, Fig. 1. This frame slides in grooves or slots in the same way as the folding frame, and is raised and lowered in the same manner, for the alternate immersion and exposure of the sheets for evaporation of the brine.

The frames are of similar construction in sections 3 and 4, Fig. 1, and side views are exhibited in Figs. 4 and 5.

Instead of sheets, strips of cloth may be suspended to the cross-bars, as seen in section 3, Fig. 1, a side view of which is exhibited in Fig. 4, the strips of cloth $a\,a$ being suspended to the cross-bar $w$; or, instead of either strips or sheets of cloth, wooden slats may be suspended to the cross-bars lengthwise across the vats, as indicated by red lines in section 4, Fig. 1, of which Fig. 5 is a side view, showing the slats $a\,a$ suspended to the cross-bar $w$ and to each other by the rings or hooks $s\,s$, made of copper or galvanized iron.

These frames may be made movable or stationary for immersion, or for the brine to flow over them from above, by means of a system of elevated pipes or troughs, which may be advantageously adopted for large salt-works in the field or open-air evaporation. When stationary the brine will flow over the suspended sheets, strips, and slats $a\,a$, and keep them constantly wet, evaporating as it runs down to the vat below, extensive surfaces being thus exposed for evaporation.

The stationary evaporating apparatus in the field-vats are supplied with brine from an elevated tank, E, Fig. 6, Sheet No. 2, by troughs $o\,o$, which pass over the top of the vats B B, distributing it to each by branch troughs $t\,t$, Figs. 6 and 7.

A central receiving-tank, D, Fig. 6, is sunk below the level of the ground. (Indicated by the line $x\,x$.) It is filled with brine from the salt-well or other source of supply, and the brine is pumped up from it into the tank E above, placed on scaffold or frame-work F F. After the brine passes over the evaporating apparatus from the troughs $o\,o$ into the vats B B, it flows from them through branch troughs or outlets $u\,u$ in the bottom into return-troughs $v\,v$, which convey the concentrated brine back to the receiving-tank D. Thus the circulation of the brine is maintained, and the operation is continued as long as necessary to raise the brine to the requisite degree of saturation with salt.

The distributing-troughs are all in red and the returning-troughs in blue lines.

For manufacturing sugar, which requires quick evaporation of the saccharine juice to prevent fermentation, the operation may be conducted as rapidly as necessary in a building with open roof, exposing the wet sheets to high heat and artificial currents of air.

Having described my invention, what I claim, and desire to secure by Letters Patent of the United States, is—

1. In combination with evaporating-vats, the vertical sliding and folding frames, on which are fastened cloths, mats, or boards so arranged as to fold over and upon each other at the bottom of the vat when the frames are lowered, and to hang in the air when the frames are raised, substantially as and for the purpose herein described.

2. The elevated distributing-troughs $o\,o$, and the return troughs $v\,v$, in combination with the tanks D and E, and the evaporating apparatus suspended in the vats B B, for the purpose and substantially as herein described.

O. MACDANIEL.

Witnesses:
J. W. SMYTH,
JULIUS R. POMEROY.